United States Patent [19]

Kinoshita et al.

[11] Patent Number: 4,898,965

[45] Date of Patent: Feb. 6, 1990

[54] ADDITIVES FOR SYNTHETIC RESINS

[75] Inventors: Mitsuo Kinoshita; Shigeru Imamura; Hirokazu Matsueda, all of Aichi, Japan

[73] Assignee: Takemoto Yushi Kabushiki Kaisha, Aichi, Japan

[21] Appl. No.: 376,141

[22] Filed: Jul. 6, 1989

Related U.S. Application Data

[63] Continuation-in-part of Ser. No. 117,797, Nov. 5, 1987, abandoned.

[30] Foreign Application Priority Data

Nov. 7, 1986 [JP] Japan ............................. 61-266435

[51] Int. Cl.$^4$ ................... C07C 122/00; C07C 69/80; C07C 69/40; C07C 69/60
[52] U.S. Cl. .................................. 558/416; 558/302; 558/399; 558/406; 558/414; 558/442; 560/88; 560/90; 560/91; 560/196; 560/198; 560/199
[58] Field of Search ............... 558/302, 399, 406, 414, 558/416, 442; 560/88, 90, 91, 196, 198, 199

[56] References Cited

U.S. PATENT DOCUMENTS 4,069,384  1/1978  Meyer .................................. 560/91

Primary Examiner—Werren B. Lone
Assistant Examiner—Vera C. Clarke
Attorney, Agent, or Firm—Flehr, Hohbach, Test, Albritton & Herbert

[57] ABSTRACT

An additive for synthetic resins contains a block copolymer having as its constituent segments both polyester block obtainable by ring-opening polymerization of $\epsilon$-aliphatic lactone and polydiene block. One or more of these polyester blocks are connected to the polydiene block through ester bond and at least one of these polyester blocks has at its end a reactive group such as vinyl group, epoxy group, isocyanate group or carboxyl group.

14 Claims, No Drawings

ADDITIVES FOR SYNTHETIC RESINS

BACKGROUND OF THE INVENTION

This is a continuation-in-part of application Ser. No. 117,797 filed Nov. 5, 1987, now abandoned.

This invention relates to additives for synthetic resins and more particularly to additives for thermosetting or thermoplastic synthetic resins containing [polydiene]/[polyester]block copolymers (hereinafter referred to as PD-PES block copolymers).

Although many kinds of thermosetting and thermoplastic synthetic resins are widely used as residential building materials such as for bathtubs and purification tanks, as industrial materials such as for machines and electrical products as materials for transportation machines such as automobiles and railroad wagons and other storage tanks and containers, it is a common practice, when they are used for processing, to add other types of synthetic resins, fillers, fiber-reinforcing materials etc. to improve their physical characteristics such as mechanical strengths. It is particularly important to improve their impact strength when their products are used for construction purposes. For this reason, it has been known to blend rubber materials and other polymers in addition to many kinds of reinforcing materials, depending on the purpose for which the material will be used. It has also been known to blend rubber materials and other thermoplastic synthetic resins in unsaturated polyesters which are examples of thermosetting synthetic resins because their volumes become reduced by 7–10% at the time of molding such that external appearance and accuracy in measurement of their molded product are adversely affected. Among the well known rubber materials which are used for improving impact strength and reducing mold shrinkage as mentioned above, there are poly-butadienes, butadiene-styrene copolymers, butadiene-acrylonitrile copolymers, butadiene-styrene-acrylonitrile copolymers and modified polybutadienes.

Synthetic resins which are principally used for reinforced plastics with improved impact strengths are commonly referred to as matrix resins. As matrix resins, thermosetting unsaturated polyester resins and thermoplastic resins such as polyethylene terephthalate, polybutylene terephthalate, polycarbonate, polyamide, etc. are widely used for such purposes. Reinforced plastics are produced by adding a rubber-type substance, a reinforcing material, a pigment, a filler, etc. to these synthetic resins and applying many kinds of molding processes.

Since matrix resins and rubber materials are so different from each other in physical characteristics such as polarity and solubility parameters, it is extremely difficult to mix them together uniformly or disperse them stably. Molded products obtained from an unstably mixed synthetic resin compound have imperfect surface conditions. Indentations and protrusions are observable and rubber materials may appear on the surface. Desired mechanical strength is not achieved and shrinkage is not reduced. If use is made of an unstably dispersed thermoplastic synthetic resin compound, furthermore, one of the components may coagulate at the time of molding. This affects the molding characteristics adversely and increases the fluctuations in the physical characteristics of molded products.

For reasons stated above, it has been desired to develop additives which can uniformly mix with an unstably dispersed thermosetting or thermoplastic matrix resins. They must have good molding characteristics so that products with superior surface qualities can be manufactured, besides being able to improve the mechanical strength of the molded products and to reduce their shrinkage.

The present invention therefore relates to additives for synthetic resins which will satisfy these requirements.

Many ideas have been advanced for improving compatibility and/or dispersibility with thermosetting or thermoplastic synthetic resins. For molding the rubber materials to be added, graft polymerization of a rubber material with another monomer such as styrene maleic acid, methacrylates, acrylates etc. have been considered (for example in Japanese Patent Publications Tokkai No. 54-18862 and 54-40846). Their graft efficiency is not high and their compatibility and dispersibility are not satisfactorily high. For improving compatibility with thermosetting synthetic resins, styrene-type block copolymers have been considered (Japanese Patent Publications Tokkai No. 53-74592 and 60-99158). Although compatibility can be improved to a certain extent by them, they are not desirable from the point of view of shrinkage and impact strength since use is made of styrene-type polymers which basically lack strength. Rubber modification of unsaturated polyester resins has also been considered such as the Diels-Alder addition of conjugate diene-products such as dicyclopentadiene to the double bond of unsaturated polyester containing $\alpha$, $\beta$-unsaturated dicarboxylic acid (Japanese Patent Publication Tokkai No. 58-2315). Although improved compatibility with unsaturated polyester resins can be expected because the amount of conjugate diene-products which are added is small, it is not effective from the points of view of shrinkage and impact strength.

SUMMARY OF THE INVENTION

The present invention provides additives for synthetic resins which can eliminate the aforementioned problems and satisfy the requirements described above.

The present invention has been accomplished by the present inventors who discovered, after a diligent study for the purpose described above, that the desired conditions are satisfied by block copolymers comprising constituent blocks including polyester parts which are obtainable by ring-opening polymerization of $\epsilon$-aliphatic lactone and the ends of which are modified by reactive groups, and a polydiene block.

DETAILED DESCRIPTION OF THE INVENTION

The present invention relates to additives for synthetic resins including a a block copolymer of the form $X+Y_n$ where X is polydiene block or hydrogenated polydiene block; Y is polyester block obtainable by ring-opening polymerization of $\Sigma$-aliphatic lactone, at least one of these polyester blocks having a reactive group selected from the group consisting of vinyl group, isocyanate group and carboxylic acid group; X and Y are connected by ester linkage; n is an integer equal to or greater than 1; and $X+Y_n$ is formed by starting with carboxyl group or hydroxyl group in polydiene or hydrogenated polydiene and by ring-opening polymerization of $\Sigma$-aliphatic lactone in the presence of a catalyst.

The block copolymers of the present invention can be obtained reliably in an industrially advantageous manner by successive ring-opening polymerization of ε-aliphatic lactone to a polydiene or hydrogenated polydiene having a hydroxyl group within its molecule, thereby forming polyester chains through the hydroxyl groups of the polydiene or hydrogenated polydiene and further by introducing reactive groups by reacting various reactants with the hydroxyl groups at the end of these polyester chains.

What is important about the block copolymers of the present invention is that they include as their constituent segments both polyester block obtainable by ring-opening polymerization of ε-aliphatic lactone and polydiene block and also that at least one of the polyester blocks has a reactive group at its end. The invention is not limited to the method of producing these block copolymers or to their structure. For example, the hydroxyl group which is present in the polydiene or hydrogenated polydiene may be in the chain part of this compound or at an end. It may also be connected to the chain directly or indirectly through any group of atoms. The present invention is not limited with respect to stereoisomerism or structural isomerism of the liquid rubber compounds which form segments due to the difference in the polymerization method such as radical polymerization, ionic, polymerization and living polymerization.

Monomer diene compounds which constitute polydiene include butadiene, isoprene, chloroprene and 1,3-pentadiene. Examples of polydiene which may be used advantageously for the purpose of the present invention include α, ω-1, 2-polybutadiene glycol (Nisso PB-G series produced by Nippon Soda Inc.), hydrogenated α, ω-1, 2-polybutadiene glycol (Nisso PB-GI series produced by Nippon Soda Inc.), end hydroxyl modified 1, 4-polybutadiene (Poly-bd R-45M or R-45HT produced by Idemitsu Sekiyu Kagaku Inc. or Arco Chemical Inc.), and hydroxy modified polyisoprene (Kuraprene KL-51 or KL-52 both with molecular weight of 25,000 and produced by Kurare Isoprene Chemical Company). Other than the polydienes described above with a hydroxyl group directly connected to a hydrocarbon chain, use may also be made of those obtained by hydroxyalkyl/esterification whereby alkylene oxide is added to the carboxyl group of a carboxyl modified polydiene or those obtained by a ring-opening reaction of the epoxy group of an epoxy modified polydiene with water, alcohol or monohydric organic acid.

In the aforementioned reaction, ε-caprolactone may be considered a representative example of ε-aliphatic lactones.

As for catalysts to be used for successive ring-opening polymerization of ε-aliphatic lactone to hydroxyl groups present as functional groups of polydiene, examples include anion polymerization catalysts, coordination anion polymerization catalysts, cation polymerization catalysts, etc. disclosed, for example, in Lectures On Polymerization Reactions, Vol. 7 Ring-Opening Polymerization (II) (published by Kagaku Dojin) at page 108. In particular, titanium catalysts such as tetrabutyl titanate, tetrapropyl titanate and tetraethyl titanate and tin catalysts such as dibutyl tin oxide, tin octylate and stannous/chloride are favorable.

Next, methods of introducing reactive groups by reacting various reactants with the end hydroxyl groups of polyester blocks are explained.

Methods of introducing vinyl group include those by acylation through reaction of ethylenic unsaturated acid halide such as acrylic acid halide and methacrylic acid halide and those by a ring-opening addition reaction of epoxy group by using a substance containing within its molecule both an ethylenic unsaturated hydrocarbon group and an epoxy group such as arylglycidyl ether and glycidyl methacrylate.

One of the methods of introducing epoxy group is through ring-opening addition of epoxy alkyl halide such as epichlorohydrin to an end hydroxy group in the presence of an acid or alkaline catalyst and further through a ring-closing reaction accompanied by dehydrohalogenation in an alkaline environment.

One of the methods of introducing isocyanate group is by reacting 1 mole of a multifunctional isocyanate compound such as diisocyanate or triisocyanate compound with 1 mole of end hydroxy group and introducing isocyanate group through urethane bond.

One of the methods of introducing carboxyl group is to react dicarboxylic acid, polybasic acid (bivalent or greater) or their anhydride with end hydroxyl group. Examples of dicarboxylic anhydride which may preferably be used include succinic anhydride, maleic anhydride, phthalic anhydride and hexa-hydrophthalic anhydride.

It goes without saying, however, that the examples given above are not intended to be limitative of the scope of the present invention.

The basic idea of the present invention is to use block copolymers with polydiene or hydrogenated polydiene connected with polyester chains as segments such that compatibility and dispersibility of polydiene with matrix resins can be improved while their original characteristics are maintained and also to cause reactive end modifications of polyester chains as described above such that the physical characteristics of molded products can be improved by forming chemical bonds with matrix resins as well as various fillers and cross-linking agents.

The block copolymers of this invention have particularly superior characteristics as additives for improving impact strength of molded products using thermosetting resins and various thermoplastic resins as matrix resin and/or reducing their molding shrinkage. It is because the block copolymers of the present invention have more uniform and stable compatibility or dispersibility with matrix resins than the rubber-like substances and thermoplastic resins which have been used conventionally for similar purposes, and also because they further form chemical bonds with matrix resins as well as various fillers and cross-linking agents. Block copolymers having the desired characteristics can be obtained by varying the molecular weights, structures and compositions of their polydiene or hydrogenated polydiene and polyester blocks and polyester parts as well as the ratio between the molecular weights. The molecular weight of the polydiene block of this invention is in the range between 1000 and 50,000 and preferably between 1000 and 5000. The number of polyester block or blocks connected to a polydiene block is from 1 to 10, and preferably from 2 to 5. Compatibility and dispersibility with matrix resins can be improved generally by controlling the molecular weight of the polyester block but it is generally desirable to adjust the content of the polyester blocks inclusive of end reactive groups in a block copolymer at 10–60 weight %. If the polyester block inclusive of end reactive groups is less than 5 weight %, dispersibility with matrix resins is poor.

In the above, the main characteristics of the block copolymers of the present invention are explained as additives but these block copolymers can be used extremely well also as a reliable dispersant for stably dispersing other types of thermoplastic resin which are not compatible with matrix resins.

The additives of the present invention include mixtures of block copolymers with appropriate amounts of elastomers or prepolymers which are thermosetting resin materials, thermoplastic resins, monomers with vinyl polymerization characteristics, organic solvents, plasticisers, organic or inorganic bulk-increasing materials, fiber reinforcing materials, etc. When block copolymers are applied to thermosetting unsaturated polyester resins, in particular, it is extremely convenient if they are diluted appropriately with a monomer with vinyl polymerization characteristics such as styrene, methylstyrene, methylmethacrylate, etc.

In what follows, examples of block copolymers and their evaluations are presented to more clearly describe the present invention.

EXAMPLES

Example of Production No. 1 (Synthesis of hydrogenated polybutadiene-polycaprolactone adduct)

Placed inside a reactor were 7000 g (0.5 moles) of hydrogenated $\alpha$, $\omega$-1, 2-polybutadiene glycol (Nisso PB-GI1000 with average molecular weight of 1400, produced by Nippon Soda, Inc.), 0.7 g of tetrabutyl titanate as catalyst and 3000 g (2.63 moles) of $\epsilon$-caprolactone for a reaction at 150° C. for 3 hours in a nitrogen gas atmosphere to attain 997 g of a yellowish, transparent, viscous liquid product.

The molecular weight of the hydrogenated polybutadiene-polycaprolactone adduct thus obtained was 2000 (hereinafter molecular weights are calculated values), the acid value was 0.3 and its hydroxyl value was 54.6.

Example of Production No. 2 (Referred to as B in Table 1 below)

Placed inside a flask were 800 g (0.4 moles) of the adduct obtained in Example of Production No. 1 and 80 g (0.8 moles) of succinic anhydride for a reaction at 120° C.-125° C. for 2 hours in a nitrogen atmosphere. After the content was cooled to 50° C., a styrene solution containing 80 weight % of block copolymer was prepared by adding 220 g of styrene monomer.

The acid and hydroxyl values of this styrene solution containing block copolymer were respectively 50.2 and 1.2, and hydrogenated polybutadiene-polyester block copolymer with carboxyl modified ends of polyester chains were thus obtained. The molecular weight of the block copolymer thus obtained was 2200, and the content of polyester block inclusive of reactive groups was 36.4 weight %.

Example of Production No. 3 (Additive F)

Placed inside a flask were 800 g (0.4 moles) of the adduct obtained in Example of Production No. 1, 4 g of boron trifluoride ether complex as catalyst and 1 g of hydroquinone as polymerization inhibitor, and 130.6 g (0.92 moles, or 15% in excess of calculated value) of glycidyl methacrylate were gradually dropped for reaction at 50-60° C. After the dropping was completed, the reaction was continued for 2 hours at 70° C.-80° C. and a block copolymer with methacryloxy group at an end was obtained.

The molecular weight of the block copolymer thus obtained was 2284 and the content of polyester part inclusive of reactive groups was 38.7 weight %.

Example of Production No. 4 (Additive G)

Placed inside a flask were 800 g (0.4 moles) of the adduct obtained in Example of Production No. 1, 100 g (0.4 moles) of methylene bisphenyl diisocyanate and 450 ml of toluene for reaction at 70° C.-80° C. for 3 hours with heating and stirring. Toluene was thereafter distilled away under reduced pressure to obtain a block copolymer having isocyanate group as end group.

The molecular weight of the block copolymer thus obtained was 2500 and the content of polyester part inclusive of reactive groups was 44.0 weight %.

Example of Production No. 5 (Additive H)

Placed inside a flask were 800 g (0.4 moles) of the adduct obtained in Example of Production No. 1, 2 g of tin tetrachloride as catalyst and 400 ml of toluene, and 81.4 g (0.88 moles) of epichlorohydrin were gradually dropped at 90° C.-100° C. for reaction. After the dropping was completed, the reaction was continued for 2 hours at the same temperature. After the reaction, 370 ml of toluene were distilled away. Next, the reaction product was moved into a shaking reactor and after 1000 ml of methanol solution containing 100 g of sodium methylate were added thereto, a reaction was continued at room temperature with severe shaking. After the mixture was left quietly, the separated methanol layer was removed. Water was added for cleaning with shaking several times to remove sodium methylate which was used in excess until it was ascertained that the cleaning water became nearly neutral. Water was then removed under reduced pressure to obtain 851 g of a product.

The product thus obtained is an end epoxy modified block copolymer and the content of oxylan oxygen was 3.9% (calculated value=3.79%) and the content of polyester part inclusive of reactive groups was 34.3 weight %.

Test Examples No. 1 (End carboxyl modified block copolymers)

Use was made of $\epsilon$-caprolactone as a polyester chain forming component and block copolymers shown in Table 1 were obtained through synthesis of an adduct as described above in Example of Production No. 1 and end carboxyl modification as described above in Example of Production No. 2.

TABLE 1

| Additive | Polydiene (molecular weight) | End Modifying Agent (Modification ratio %) | Molecular Weight of Block Copolymer (average) | Content of Polyester Block and Reactive Groups (%) |
|---|---|---|---|---|
| A | Hydrogenated $\alpha$, $\omega$-1, 2-polybutadiene glycol (1400) | maleic anhydride (100) | 1946 | 28.1 |
| B | Same as above | succinic anhydride (100) | 2200 | 36.4 |
| C | Same as | phthalic | 3022 | 55.4 |

TABLE 1-continued

| Additive | Polydiene (molecular weight) | End Modifying Agent (Modification ratio %) | Molecular Weight of Block Copolymer (average) | Content of Polyester Block and Reactive Groups (%) |
|---|---|---|---|---|
| | above | anhydride (75) | | |
| D | Dihydroxy-ethyl ester of α, ω-1, 2-polybutadiene dicarboxylic acid (1608) | maleic anhydride (100) | 2209 | 31.7 |
| E | Same as above | succinic anhydride (50) | 3304 | 54.3 |

Evaluation No. 1

Placed in a beaker were 60 weight parts of a styrene solution of unsaturated polyester resin containing 60% of solid component (Polyset 9107 produced by Hitachi Kasei, Inc.: phythalic ester type), 27 weight parts of styrene monomer and 13 weight parts of an additive listed in Table 1. After the mixture was made uniform and stirred by a propeller stirrer for five minutes, it was moved into a 100 ml measuring cylinder and its phase separation (volume %) was measured over a period of time while it was left quietly at room temperature. The results are shown in Table 2.

TABLE 2

| Additive | Condition Immediately After Resting Quietly | After 1 Hour | After 6 Hours | After 24 Hours |
|---|---|---|---|---|
| A | white turbed dispersion with small particles | 0 | 0 | 4 |
| B | Same as above | 0 | 0 | 0 |
| C | Nearly soluble minute dispersion | 0 | 0 | 0 |
| D | White turbed dispersion with small particles | 0 | 0 | 2 |
| E | Nearly soluble minute dispersion | 0 | 0 | 0 |
| HPBG | Separation into two layers | 12 | 13 | 13 |
| SBS | white turbed dispersion partial separation | 12 | 13 | 14 |
| | | 12 | 13 | 14 |
| PCL | nearly soluble minute dispersion | 0 | 0 | 0 |

(Notes)
A-K: as explained in Table 1
HPBG: hydrogenated α, ω-1, 2-polybutadiene glycol (Nisso PB-GI 1000 produced by Nippon Soda, Inc.)
SBS: styrene-butadiene-styrene block copolymer (Califlex TR1102 produced by Shell Chemical, Inc.)
PCL: Polycaprolactone (Placcel 220 produced by Dycel, Inc.)

Evaluation No. 2

Placed inside a Banbury mixer were 40 weight parts of 33% styrene solution of the additive B in Table 1, 60 weight parts of thermosetting unsaturated polyester resin (Yupika 7507 produced by Nippon Yupika, Inc.) 1.5 weight parts of tertiary butylperbenzoate and 3.0 weight parts of zinc stearate. To this was added 200 weight parts of calcium carbonate powder and after the mixture became uniform, 60 weight parts of glass fibers with fiber lengths ½ inches were added. One minute later, the mixer was stopped and the premix thus obtained was molded at 145°. A product with uniform surface luster was obtained and its molding shrinkage was 0.003%.

With another premix which was formed under the same conditions as above except hydrogenated α, ω-1,2-polybutadiene glycol (described in Example of Production No. 1) was substituted for the block copolymer. The surface luster was extremely irregular and it was unsightly.

Evaluation No. 3

A 33% styrene solution of the block copolymer of B shown in Table 1 was prepared. Uniformly mixed with 40 weight parts of this solution were 60 weight parts of Polyset 9120 (Produced by Hitachi Kasei, Inc.), 3 weight parts of zinc stearate, 1.5 weight parts of tertiary butyl perbenzoate, 140 weight parts of calcium carbonate powder and 0.3 weight parts of parabenzoguinone. To this were added 2 weight parts of magnesium oxide and a composition for SMC containing 10% of glass fibers of length 1" was produced immediately. This was molded at mold temperature at 140° C. The product thus obtained showed some cloudiness on the surface, but its surface luster was uniform and its molding shrinkage was 0.04%.

With a composition for SMC produced in an identical manner as described above except HPBG or PCL (described in Table 2) was used instead of the block copolymer, by contrast, the surface luster was extremely irregular (in the case of HPBG). Flow patterns were also observable and the molding shrinkage was −0.25%. In this example, dope stability was poor before magnesium oxide was added and there was clearly a phase separation. From this point of view, too it was clear that such a product was extremely difficult to handle industrially. In the case of PCL, the surface conditions of the molded products were superior from the points of view of luster and smoothness but the molding shrinkage was as large as 0.45%.

Evaluation No. 4

Added to 500 weight parts of 33% styrene solution of the block copolymer of F described in Example of Production No. 3 were 500 weight parts of Polylite PC-670 (produced by Dai-Nippon Ink, Inc.) as thermosetting unsaturated polyester resin, and 60 weight parts of cobalt naphthenate were dissolved to obtain a liquid with viscosity 820 centipoise. This liquid was pumped into a mold (commonly referred to as RIM or RTM) provided with a glass mat for injection molding while acetylacetone peroxide was mixed to it at the rate of 1%. The diameter of the inlet of this mold was 20 mm and the mold temperature was 25° C. at the time of the injection. Two hours later, the mold temperature began to rise by the heat of polymerization and a maximum temperature of 70° C. was reached still three hours later. The mold was opened still three hours later and the molded product was taken out. The external appearance of this product was uniform and there were no irregularities in luster. Its surface was smoother than that of a comparison product obtained in an identical manner as described above except the block copolymer was not used. Glass fibers were hardly observable.

Evaluation No. 5

Two 33% styrene solutions of block copolymers respectively of E described in Table 1 and G described in Example of Production No. 4 were prepared. After 40 weight parts of each of these solutions were uniformly mixed with 60 weight parts of Polyset 9127 (produced by Hitachi Kasei, Inc.) as thermosetting unsaturated polyester resin, 1.5 weight parts of tertiary butyl perbenzoate and 140 weight parts of calcium carbonate powder, and 5 weight parts of MDI were added to this dope with stirring. A composition for SMC containing 27% of glass fibers of length 1" was produced immediately and this was molded into a plate at 45° C. The surface of the product was light yellowish brown because the MDI thickening method was used but there were hardly any luster irregularities and the molding shrinkage was 0.03% with E and 0.02% with G. Izod impact strength (with notches) was 15.0 ft-lb/inch with the former and 16.1 ft-lb/inch with the latter.

By contrast, the surface of a comparison product obtained under the same conditions as described above except dihydroxyethyl ester of $\alpha, \omega$-1, 2-polybutadiene dicarboxylic acid (described in Table 1) was used instead of the block copolymer of the present invention was colored only to the same extent but there were luster irregularities and glass fibers were observable. It may be concluded from this, too, that the molding shrinkage is large and its izod impact strength with notches was 13.2 ft-lb/inch.

It is clear from the examples and evaluations given above that the present invention can improve physical characteristics of molded products such as compatibility, dispersibility and molding workability as well as surface characteristics and molding shrinkage.

What is claimed is:

1. An additive for synthetic resins including a block copolymer of the form $X+Y)_n$ where
    X is polybutadiene block, hydrogenated polybutadiene block, polyisoprene block or hydrogenated polyisoprene block with molecular weight 1000–50,000,
    Y is polyester block obtained by ring-opening polymerization of $\epsilon$-aliphatic lactone, at least one of said polyester blocks having a reactive group selected from the group consisting of vinykl group, isocyanate group and carboxylic acid group,
    X and Y are connected by ester linkage,
    n is an integer between 1 and 10, and
    $X+Y)_n$ is obtained by starting with carboxyl group or hydroxyl group in polybutadiene, hydrogenated polybutadiene, polyisoprene or hydrogenated polyisoprene and by ring-opening polymerization of said $\epsilon$-aliphatic lactone in the presence of a catalyst, said polyester block or blocks and said reactive group or groups comprising 10–60 weight % of said block copolymer.

2. The additive of claim 1 wherein said $\epsilon$-aliphatic lactone is $\epsilon$-caprolactone.

3. The additive of claim 1 wherein said reactive group or groups are vinyl group formed by reacting an epoxy compound having ethylenically unsaturated group or ethylenically unsaturated carboxylic acid halide with an end hydroxyl group of said polyester block or blocks.

4. The additive of claim 2 wherein said reactive group or groups are vinyl group formed by reacting an epoxy compound having ethylenically unsaturated group or ehtylenically unsaturated carboxylic acid halide with an end hydroxyl group of said polyester block or blocks.

5. The additive of claim 3 wherein said epoxy compound is glycidyl methacrylate.

6. The additive of claim 4 wherein said epoxy compound is glycidyl methacrylate.

7. The additive of claim 1 wherein said reactive group or groups are isocyanate group formed by reacting a multifunctional isocyanate compound selected from diisocyanate or triisocyanate with an end hydroxyl group of said polyester block or blocks.

8. The additive of claim 2 wherein said reactive group or groups are isocyanate group formed by reacting a multifunctional isocyanate compound selected from diisocyanate or triisocyanate with an end hydroxyl group of said polyester block or blocks.

9. The additive of claim 7 wherein said multifunctional isocyanate compound is methylene bisphenyl diisocyanate.

10. The additive of claim 8 wherein said multifunctional isocyanate compound is methylene bisphenyl diisocyanate.

11. The additive of claim 1 wherein said reactive group or groups are carboxylic acid group formed by reacting dicarboxylic axis, tricarboxylic acid or an anhydride thereof with an end hydroxyl group of said polyester block or blocks.

12. The additive of claim 2 wherein said reactive group or groups are carboxylic acid group formed by reacting dicarboxylic acid, tricarboxylic acid or an anhydride thereof with an end hydroxyl group of said polyester block or blocks.

13. The additive of claim 11 wherein said anhydride is maleic anhydride, succinic anhydride or phthalic anhydride.

14. The additive of claim 12 wherein said anhydride is maleic anhydride, succinic anhydride or phthalic anhydride.

* * * * *